(12) United States Patent
Nakamori et al.

(10) Patent No.: US 8,996,006 B2
(45) Date of Patent: Mar. 31, 2015

(54) MOBILE STATION, RADIO BASE STATION, MOBILE COMMUNICATION SYSTEM, AND MOBILE COMMUNICATION METHOD

(75) Inventors: Takeshi Nakamori, Yokohama (JP); Hiroyuki Ishii, Yokohama (JP); Mikio Iwamura, Tokyo (JP); Kengo Yagyu, Yokohama (JP)

(73) Assignee: NTT DOCOMO, Inc., Tokyo (JP)

(*) Notice: Subject to any disclaimer, the term of this patent is extended or adjusted under 35 U.S.C. 154(b) by 0 days.

(21) Appl. No.: 13/392,179

(22) PCT Filed: Aug. 18, 2010

(86) PCT No.: PCT/JP2010/063909
§ 371 (c)(1),
(2), (4) Date: Mar. 29, 2012

(87) PCT Pub. No.: WO2011/024681
PCT Pub. Date: Mar. 3, 2011

(65) Prior Publication Data
US 2012/0190367 A1    Jul. 26, 2012

(30) Foreign Application Priority Data
Aug. 27, 2009    (JP) .................... 2009-197046

(51) Int. Cl.
*H04Q 7/00*    (2006.01)
*H04W 36/00*    (2009.01)

(52) U.S. Cl.
CPC ................. *H04W 36/0083* (2013.01)
USPC ........... 455/436; 455/525; 455/574; 370/328; 370/329; 370/338

(58) Field of Classification Search
CPC ..... H04W 36/08; H04W 36/16; H04W 36/20; H04W 36/30
USPC ................ 455/436, 525, 574; 370/328–338
See application file for complete search history.

(56) References Cited

U.S. PATENT DOCUMENTS

| 8,060,153 B2* | 11/2011 | Jeong et al. ............ 455/436 |
| 2005/0186957 A1 | 8/2005 | Sako et al. |
| 2010/0029276 A1* | 2/2010 | Hwang ............ 455/436 |

FOREIGN PATENT DOCUMENTS

| JP | 8-154264 A | 6/1996 |
| JP | 2001-525138 A | 12/2001 |

(Continued)

OTHER PUBLICATIONS

3GPP TS 36.300 V8.10.0, Sep. 2009, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 147 pages.

(Continued)

*Primary Examiner* — Patrick Edouard
*Assistant Examiner* — Julio Perez
(74) *Attorney, Agent, or Firm* — Osha Liang LLP

(57) ABSTRACT

A mobile station UE according to the present invention includes: a determination unit 14 configured to determine whether to notify a measurement result based on the radio quality in the serving cell and the neighboring cell measured by the measurement unit 13, and the parameter acquired by the parameter acquisition unit 12; and a notification unit 15 configured to notify the radio base station eNB of the measurement result when the determination unit 14 determines that the measurement result is to be transmitted, in which only when a first predetermined period or more has elapsed after the mobile station UE starts to communicate with the serving cell, the determination unit 14 is configured to determine whether to notify the measurement result.

8 Claims, 5 Drawing Sheets

(56) References Cited

FOREIGN PATENT DOCUMENTS

| JP | 2003-500909 A | 1/2003 |
|---|---|---|
| JP | 2004-072157 A | 3/2004 |
| JP | 2007-266993 A | 10/2007 |
| JP | 2008-042764 A | 2/2008 |
| JP | 2009-136026 A | 6/2009 |
| JP | 2009-542083 A | 11/2009 |
| WO | 9852375 A2 | 11/1998 |
| WO | 00/70897 A1 | 11/2000 |
| WO | 2004/098221 A1 | 11/2004 |
| WO | 2005/002268 A1 | 1/2005 |
| WO | 2007/148911 A1 | 12/2007 |
| WO | 2008009725 A1 | 1/2008 |

OTHER PUBLICATIONS

3GPP TS 36.300 V9.1.0, Sep. 2009, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 165 pages.

3GPP TS 36.214 V8.7.0, Sep. 2009, "3rd Generation Partnership Project; Technical Specification Group Radio Access Network; Evolved Universal Terrestrial Radio Access (E-UTRA); Physical layer—Measurements (Release 8)," 12 pages.

3GPP TS 36.331 V8.7.0, Sep. 2009, "3rd Generation Partnership Project; Technical Specification Group Radio Access Network; Evolved Universal Terrestrial Radio Access (E-UTRA); Radio Resource Control (RCR); Protocol specification (Release 8)," 208 pages.

3GPP TS 36.331 V9.0.0, Sep. 2009, "3rd Generation Partnership Project; Technical Specification Group Radio Access Network; Evolved Universal Terrestrial Radio Access (E-UTRA); Radio Resource Control (RCR); Protocol specification (Release 9)," 213 pages.

3GPP TS 36.213 V8.3.0, May 2008, "3rd Generation Partnership Project; Technical Specification Group Radio Access Network; Evolved Universal Terrestrial Radio Access (E-UTRA); Physical layer procedures (Release 8)," 45 pages.

International Search Report issued in PCT/JP2010/063909, mailed on Nov. 30, 2010, with translation, 5 pages.

Office Action for Japanese Application No. 2009-197046, mailed Dec. 19, 2012, with English translations thereof (5 pages).

Office Action issued in corresponding Japanese Application No. 2013-023491, mailed Oct. 22, 2013 (4 pages).

\* cited by examiner

MOBILE STATION, RADIO BASE STATION, MOBILE COMMUNICATION SYSTEM, AND MOBILE COMMUNICATION METHOD

TECHNICAL FIELD

The present invention relates to a mobile station, a radio base station, a mobile communication system, and a mobile communication method.

BACKGROUND ART

In a mobile communication system including a plurality of cells, a mobile station UE (User Equipment) is configured to continue communication through cell switching when moving from one cell to another cell. The cell switching will be referred to as a "handover".

In general, a mobile communication system is configured such that a mobile station UE moves to neighbouring cells, and in the mobile station UE, if received power of a signal from a neighbouring cell is larger than received power of a signal from a serving cell, then the mobile station UE is handed over to the neighbouring cell.

In addition, the received power of the signal from the neighbouring cell or the received power of the signal from the serving cell, for example, corresponds to received power (RSRP: Reference Signal Received Power) of a downlink reference signal which is transmitted from the neighbouring cell or the serving cell.

With reference to FIG. 7 and FIG. 8, an example of a handover procedure will be described in detail.

As illustrated in FIG. 7, in step S1, a mobile station UE measures received power of a signal from a neighbouring cell.

In step S2, the mobile station UE determines whether the received power of the signal from the neighbouring cell satisfies Equation 1 below.

received power of signal from neighbouring cell+
hysteresis>received power of signal from serving
cell           [Equation 1]

When it is determined that Equation 1 is satisfied, the mobile station UE notifies a network of an event A3 for reporting the above-mentioned measurement result in step S2.

Specifically, as illustrated in FIG. 8, the mobile station UE measures received power of signals from a serving cell (a cell A) and a neighboring cell (a cell B) to be monitored, and determines whether to notify the above-mentioned measurement result using "hysteresis [dB]" and "TTT (Time To Trigger) [ms]" notified in advance.

That is, in FIG. 8, when the received power (radio quality) of the signal from the cell B continuously exceeds the received power (radio quality) of the signal from the cell A for a predetermined period "TTT" or more and over the "hysteresis", the mobile station UE determines that the above-mentioned measurement result (Measurement Report) should be notified.

Here, it is assumed that a value calculated by the following Equation 2 and Equation 3 is used as the received power (radio quality) Fn of the signal. Specifically, in the mobile station UE, an upper layer is configured to perform a filtering process (L3 filtering) expressed by Equation 2 with respect to a measurement value by a physical layer.

$$Fn = (1-a) \cdot Fn-1 + a \cdot Mn$$  [Equation 2]

$$a = \frac{1}{2}(k/4)$$  [Equation 3]

It is noted that a value of "k" in Equation 3 has been notified in advance from a radio base station to the mobile station UE, similarly to the "hysteresis" or the "TTT". Furthermore, the "hysteresis" is a value provided in order to prevent a handover from a serving cell to a neighbouring cell from frequently occurring at a cell boundary, and may have a positive value or a negative value.

Furthermore, in step S3, if a notification of the event A3 is received, the network decides that the mobile station UE should be handed over to a cell according to the received event A3.

Next, when the network decides that the mobile station UE should be handed over, the network instructs information on the cell to be handed over with respect to the mobile station UE. Then, the mobile station UE is handed over to the cell and notifies the network of handover completion.

As described above, in the mobile communication system, when a radio base station eNB and the mobile station UE are in a connected state, handover control is applied.

Here, the mobile station UE compares the measured received power in the serving cell and the neighboring cell with a determination condition threshold value based on a parameter notified in advance, and determines whether to notify the network of the measurement result.

In other words, even just after the serving cell has been changed by the handover, when it is determined that the measurement result should be notified again, the mobile station UE notifies the network of the measurement result again.

This attributes to the fact that a parameter in the determination conditions is small. However, when the mobile station UE is located at the boundary between the serving cell and the neighboring cell, the handover control may be unnecessarily performed. Here, the parameter in the determination conditions, for example, indicates hysteresis or TTT.

Furthermore, when the parameter in the above-mentioned determination conditions is large, the above-mentioned unnecessary handover control may be reduced. However, specifically, at the time of high speed movement, the measurement result may not be notified at an appropriate timing, so that a handover may be delayed and thus appropriate control may not be performed.

SUMMARY OF THE INVENTION

Therefore, the present invention has been achieved in view of the above-described problems, and an object thereof is to provide a mobile station, a radio base station, a mobile communication system, and a mobile communication method, by which it is possible to prevent the delay of a handover while reducing unnecessary handover control.

A first characteristic of the present invention is summarized as a mobile station, which communicates with a radio base station, comprising, a parameter acquisition unit configured to acquire a parameter from the radio base station, a measurement unit configured to measure radio quality in a serving cell and a neighboring cell of the mobile station, a determination unit configured to determine whether to notify a measurement result based on the radio quality in the serving cell and the neighboring cell measured by the measurement unit, and the parameter acquired by the parameter acquisition unit, and a notification unit configured to notify the radio base station of the measurement result when the determination unit determines that the measurement result is to be transmitted, in which only when a first predetermined period or more has elapsed after the mobile station starts to communicate with the serving cell, the determination unit is configured to determine whether to notify the measurement result.

A second characteristic of the present invention is summarized as a radio base station, which communicates with a mobile station, comprising, a determination unit configured to determine whether the mobile station performs a handover based on a measurement result of radio quality in a serving cell and a neighboring cell of the mobile station, which has been notified by the mobile station, in which the determination unit is configured to determine whether the mobile station performs a handover only when a fourth predetermined period or more has elapsed after the mobile station starts to communicate with the serving cell.

A third characteristic of the present invention is summarized as a mobile communication system so configured that a radio base station communicates with a mobile station, in which the mobile station comprises, a parameter acquisition unit configured to acquire a parameter from the radio base station, a measurement unit configured to measure radio quality in a serving cell and a neighboring cell of the mobile station, a determination unit configured to determine whether to notify a measurement result based on the radio quality in the serving cell and the neighboring cell measured by the measurement unit, and the parameter acquired by the parameter acquisition unit, and a notification unit configured to notify the radio base station of the measurement result when the determination unit determines that the measurement result is to be transmitted, and the radio base station comprises, a parameter notification unit configured to notify the mobile station of the parameter, and a determination unit configured to determine whether the mobile station performs a handover based on the measurement result of the radio quality in the serving cell and the neighboring cell of the mobile station, which has been notified by the mobile station, in which only when a first predetermined period or more has elapsed after the mobile station starts to communicate with the serving cell, the determination unit of the mobile station is configured to determine whether to notify the measurement result.

A fourth characteristic of the present invention is summarized as A mobile communication method, in which a radio base station communicates with a mobile station, comprising, a step A of notifying a parameter, by the radio base station, to the mobile station, a step B of measuring, by the mobile station, radio quality in a serving cell and a neighboring cell of the mobile station, a step C of determining, by the mobile station, whether to notify a measurement result based on the radio quality in the serving cell and the neighbouring cell measured in the step B, and the parameter notified in step A, and a step D of notifying the measurement result, by the mobile station, to the radio base station, when it is determined that the measurement result is to be transmitted, in which in the step C, only when a first predetermined period or more has elapsed after the mobile station starts to communicate with the serving cell, the mobile station determines whether to notify the measurement result.

As described above, according to the present invention, it is possible to provide a mobile station, a radio base station, a mobile communication system, and a mobile communication method, by which it is possible to prevent the delay of a handover while reducing unnecessary handover control.

DETAILED DESCRIPTION (Configuration of mobile communication system according to first embodiment of the present invention)

Figure 1:
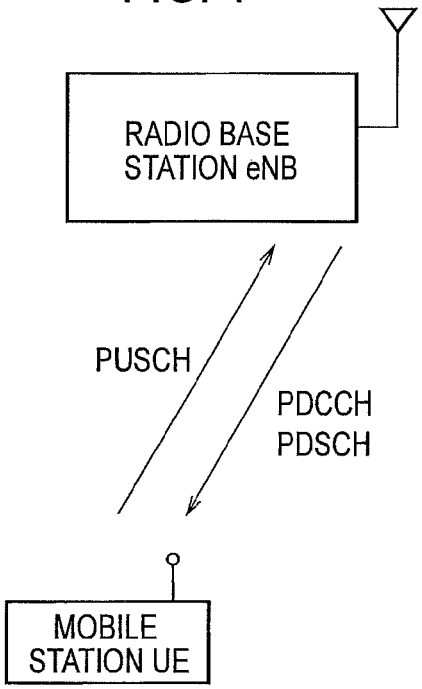
FIG. 1 is a diagram illustrating the entire configuration of a mobile communication system according to a first embodiment of the present invention.
Figure 2:
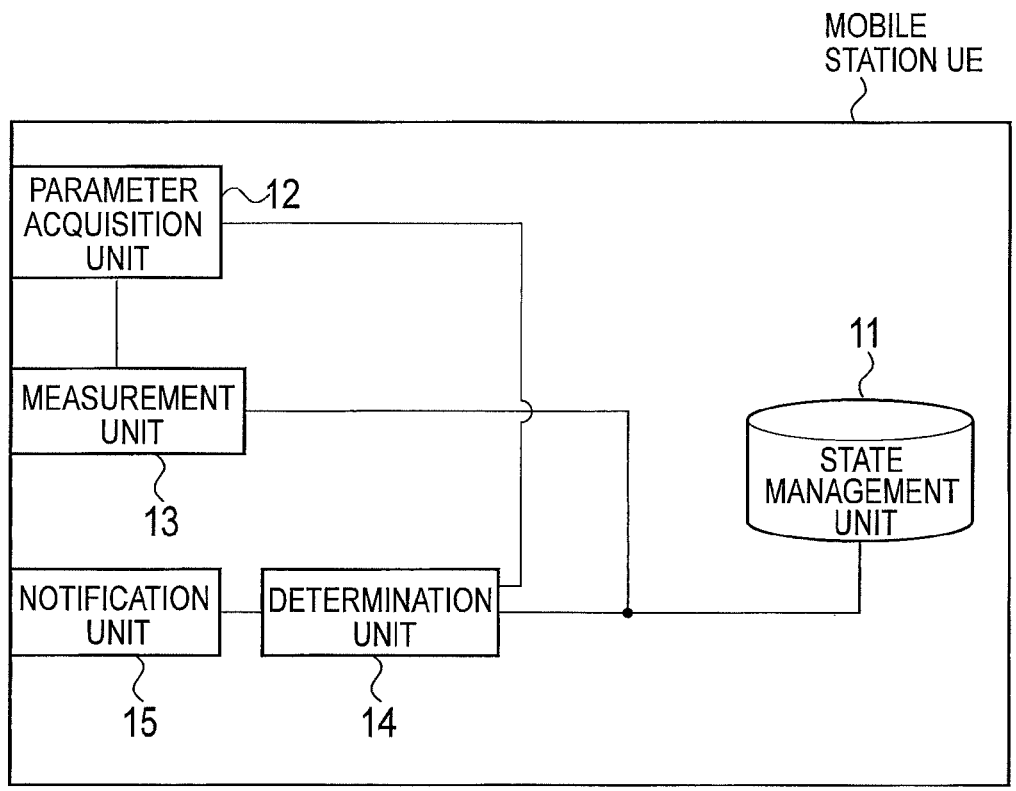
FIG. 2 is a functional block diagram of a mobile station according to the first embodiment of the present invention.
Figure 3:
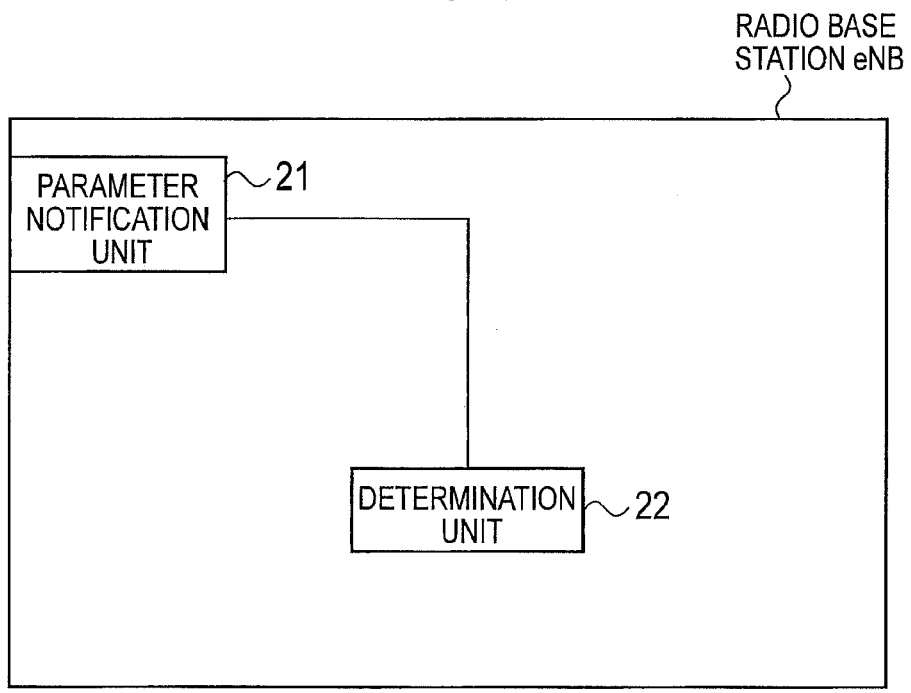
FIG. 3 is a functional block diagram of a radio base station according to the first embodiment of the present invention.

With reference to FIG. 1 to FIG. 3, the configuration of a mobile communication system according to the first embodiment of the present invention will be described.

As illustrated in FIG. 1, the mobile communication system according to the present embodiment is an LTE (Long Term Evolution) mobile communication system.

In the mobile communication system, it has been discussed that as a radio access scheme, an "OFDM (Orthogonal Frequency Division Multiplexing) scheme" is applied to a downlink, and an "SC-FDMA (Single-Carrier Frequency Division Multiple Access) scheme" is applied to an uplink.

The OFDM scheme is a scheme in which a specific frequency band is divided into a plurality of narrow frequency bands (subcarriers), and data is loaded on each frequency band for transmission. According to the OFDM scheme, subcarriers are densely arranged on the frequency axis without being interfering with one another while partially overlapping one another, so that high-rate transmission is achieved, resulting in the improvement of frequency use efficiency.

Furthermore, the SC-FDMA scheme is a transmission scheme in which a specific frequency band is divided, and transmission is performed using different frequency bands among a plurality of mobile stations UEs, so that it is possible to reduce interference among the plurality of mobile stations UEs. According to the SC-FDMA scheme, since a variation in transmission power is small, it is possible to achieve low power consumption of the mobile station UE and expansion of coverage.

Furthermore, in the mobile communication system according to the present embodiment, a radio base station eNB is configured to transmit a downlink control signal via a physical downlink control channel PDCCH, and transmit a downlink data signal via a physical downlink shared data channel PDSCH (Physical Downlink Shared Channel).

Meanwhile, in the mobile communication system according to the present embodiment, a mobile station UE is configured to transmit an uplink data signal via a physical uplink shared data channel PUSCH (Physical Uplink Shared Channel).

As illustrated in FIG. 2, the mobile station UE includes a state management unit 11, a parameter acquisition unit 12, a measurement unit 13, a determination unit 14, and a notification unit 15.

The state management unit 11 is configured to manage whether a first predetermined period or more has elapsed after the mobile station UE starts to communicate with a serving cell.

The parameter acquisition unit 12 is configured to acquire various parameters from the radio base station eNB.

The measurement unit 13 is configured to measure radio quality in a serving cell and a neighboring cell of the mobile station UE.

For example, the measurement unit 13 may also be configured to measure received power of a signal, for example, a reference signal (RS) from the serving cell and the neighboring cell of the mobile station UE as radio quality in the serving cell and the neighboring cell of the mobile station UE. In addition, the received power of the reference signal may also be called "RSRP (Reference Signal Received Power)".

Furthermore, the measurement unit 13 may use the value calculated by Equation 2 and Equation 3 described above as a measurement value of the received power Fn of the signal from the serving cell and the neighboring cell of the mobile station UE. For example, a measurement interval in a physical layer is 200 ms.

The determination unit 14 is configured to determine whether to notify the radio base station eNB of a measurement result (Measurement Report) obtained by the measurement unit 13.

For example, the determination unit 14 may also be configured to determine that the above-mentioned measurement result should be notified when predetermined conditions are continuously satisfied for a second predetermined period or more. Here, the determination unit 14 may use the above-mentioned condition (Equation 1) as the predetermined condition.

In addition, the parameter includes a parameter ("TTT") indicating the above-mentioned second predetermined period, a parameter ("hysteresis" or "k (a filter coefficient)") and the like defining the above-mentioned predetermined condition.

Furthermore, the parameter includes a parameter indicating a period (the first predetermined period) for which the operation of the mobile station UE is limited after the mobile station UE starts to communicate with the serving cell.

As apparent from the above example, in the mobile communication system according to the present embodiment, the operation of the mobile station UE is configured to be limited for the first predetermined period after the mobile station UE starts to communicate with the serving cell.

For example, a value (256 [ms]) of the parameter indicating the above-mentioned second predetermined period may also be configured to be shorter than a value (1000 [ms]) of the parameter indicating the first predetermined period for which the operation of the mobile station UE is limited after the mobile station UE starts to communicate with the serving cell, or vice versa.

Hereinafter, an effect will be described, which is obtained when the determination unit 14 determines whether to notify the measurement result based on the radio quality in the serving cell and the neighbouring cell, which has been measured by the measurement unit 13, and the parameter acquired by the parameter acquisition unit 12, only when the first predetermined period or more has elapsed after the mobile station UE starts to communicate with the serving cell.

In handover control, the mobile station UE measures the radio quality in the serving cell and the neighboring cell, and determines whether to notify the measurement result using the measurement result. In order to solve the instability of determination due to a variation in a radio environment, a parameter is used, which indicates the first predetermined period, the second predetermined period, or the predetermined condition used for the determination.

However, since the second predetermined period used together with the measurement result is set independently of the first predetermined period which is a period after the mobile station UE starts to communicate with the serving cell, for example, when the first predetermined period has a small value, a mobile station UE located around the boundary between the serving cell and the neighboring cell may notify a measurement result and be handed over to the neighbouring cell in a very short period after the mobile station UE starts to communicate with the serving cell.

Specifically, a mobile station UE located around the cell boundary for a constant period may repeat a handover among neighbouring cells, resulting in an increase in control load in a mobile station UE and a radio base station eNB.

Meanwhile, when the above-mentioned first predetermined period has a large value, it is possible to avoid the above-mentioned problem that a handover is repeated among neighbouring cells. However, a handover may be delayed at the time of high speed movement, resulting in the degradation of communication quality.

Thus, as described above, only when the first predetermined period or more has elapsed after the mobile station UE starts to communicate with the serving cell, the mobile station UE determines whether to notify the measurement result, specifically, a mobile station UE located around the cell boundary for a constant period can appropriately perform handover control.

In this case, the value of the first predetermined period is set to be small in time for high speed movement, so that it is possible to prevent the degradation of communication quality at the time of high speed movement, and to avoid the above-mentioned problem that a handover is repeated around the cell boundary.

In addition, the above-mentioned first predetermined period and second predetermined period may also be autonomously held in advance, that is, held by the mobile station UE as a fixed parameter, or notified from the radio base station eNB.

Furthermore, when a third predetermined period or more has elapsed after the mobile station UE starts to communicate with the serving cell, the measurement unit 13 may also be configured to determine that the measurement of the radio quality in the serving cell and the neighboring cell of the mobile station UE should be started. Here, the third predetermined period may be equal to or different from the above-mentioned first predetermined period.

The notification unit 15 is configured to notify the radio base station eNB of the measurement result when the determination unit 14 determines that the measurement result should be transmitted.

Specifically, the notification unit 15 is configured to notify the radio base station eNB of the measurement result through the physical uplink shared channel PUSCH. The measurement result may also be called "Measurement Report".

As illustrated in FIG. 3, the radio base station eNB includes a parameter notification unit 21 and a determination unit 22.

The parameter notification unit 21 is configured to notify the mobile station UE of a parameter indicating the above-mentioned predetermined period, a first parameter indicating the above-mentioned second predetermined period, or a second parameter indicating the above-mentioned third predetermined period.

Specifically, the parameter notification unit 21 is configured to notify the mobile station UE of the above-mentioned parameter, the first parameter, or the second parameter via the physical downlink shared channel PDSCH.

In addition, the above-mentioned parameter, the first parameter, or the second parameter may also be notified to the mobile station UE as broadcast information or "RRC Message" which is individual control information.

The determination unit 22 is configured to determine whether the mobile station UE should perform a handover, based on the measurement result of the radio quality in the serving cell and the neighboring cell of the mobile station UE, which has been notified by the mobile station UE.

In addition, the determination unit 22 may also be configured to determine whether the mobile station UE should perform a handover, only when a fourth predetermined period has elapsed after the mobile station UE starts to communicate with the serving cell.

(Operation of the Mobile Communication System According to the First Embodiment of the Present Invention)

Figure 4:
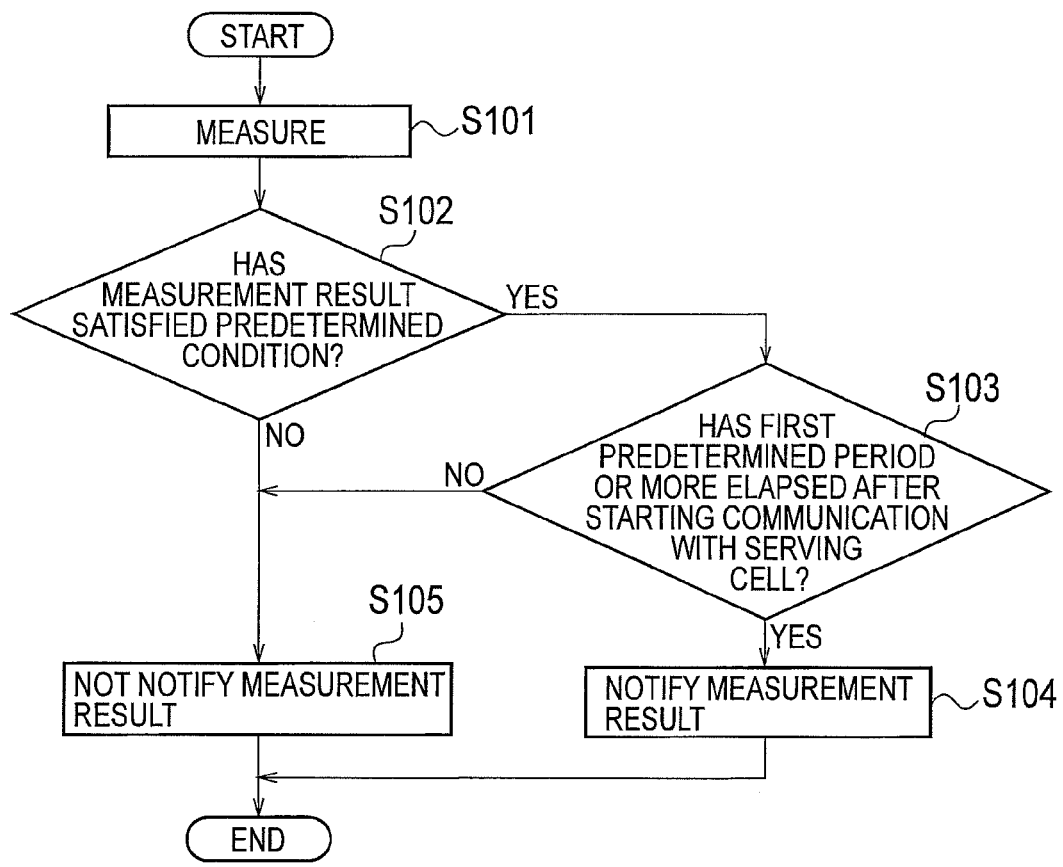
FIG. 4 is a flowchart illustrating the operation of the mobile station according to the first embodiment of the present invention.

With reference to FIG. 4, the operation of the mobile communication system according to the first embodiment of the present invention, specifically, an operation, in which the mobile station UE according to the first embodiment of the present invention notifies the above-mentioned measurement result, will be described.

As illustrated in FIG. 4, in step S101, the mobile station UE measures radio quality in a serving cell and a neighboring cell.

In step S102, the mobile station UE determines whether the measurement result satisfies predetermined conditions. When it is determined that the measurement result satisfies the predetermined conditions, the mobile station UE determines whether the first predetermined period or more has elapsed after the mobile station UE starts to communicate with the serving cell in step S103.

When it is determined that the first predetermined period or more has elapsed after the mobile station UE starts to communicate with the serving cell, the mobile station UE notifies the radio base station eNB of the measurement result in step S104.

For example, when it is determined that Equation 4 to Equation 6 are continuously satisfied for the second predetermined period "0.256 [s]" and the first predetermined period or more has elapsed after the mobile station UE starts to communicate with the serving cell, the mobile station UE determines that the above-mentioned measurement result should be notified to the radio base station eNB.

received power of signal from neighbouring cell $Fn+2$ [dB]>received power of signal from serving cell  [Equation 4]

$Fn=(1-a)\cdot Fn-1+a\cdot Mn$  [Equation 5]

$a=\frac{1}{2}$  Equation 6

When it is determined that the first predetermined period or more has not elapsed after the mobile station UE starts to communicate with the serving cell in step S103, the mobile station UE determines that the above-mentioned measurement result should not be notified to the radio base station eNB in step S105.

Furthermore, in the above-mentioned mobile communication system according to the first embodiment, the received power of the reference signal (RSRP) is used as the radio quality in the serving cell and the neighboring cell. However, instead, RSRQ (Reference Signal Received QualityPower), RS-SIR, or CQI may also be used. Otherwise, as the radio quality in the serving cell and the neighboring cell, at least one of the RSRP, the RSRQ, the RS-SIR, and the CQI may also be used.

In addition, the RSRQ is a value obtained by dividing received power of a downlink reference signal by RSSI (Received Signal Strength Indicator) of a downlink.

Here, the RSSI indicates the total reception level observed in a mobile station, and indicates a reception level including all of thermal noise, interference power from another cell, power of a desired signal from an own cell, and the like (refer to 3GPP TS36.214, V8.3.0 for the definition of the RSRQ).

Furthermore, the RS-SIR indicates SIR (Signal-to-Interference Ratio) of a downlink reference signal.

Furthermore, the CQI (Channel Quality Indicator) indicates downlink radio quality information (refer to 3GPP TS36.213, V8.3.0 for the definition of the CQI).

So far, the mobile communication system according to the present embodiment has been described using an LTE mobile communication system. However, the present invention can also be applied in the same manner to other mobile communication systems employing an HSDPA scheme, an HSUPA scheme, an LTE-Advanced scheme, WiMAX and the like.

(Operation and Effect of the Mobile Communication System According to the First Embodiment of the Present Invention)

In accordance with the mobile communication system according to the first embodiment of the present invention, it is possible to determine whether to notify the radio base station eNB of a measurement result according to a period after the mobile station UE starts to communicate with the serving cell, so that the mobile station UE can report the measurement result to a network at an appropriate timing, continue communication without an unnecessary increase in handover control and causing communication interruption, suppress load in the network or current consumption of the mobile station UE, and further improve user convenience.

(First Modification)

In the above-mentioned mobile communication system according to the first embodiment, the mobile station UE determines whether to notify the above-mentioned measurement result using the above-mentioned first predetermined period. However, in the mobile communication system according to the first modification, the mobile station UE may also determine whether to perform the above-mentioned measurement using the third predetermined period.

Figure 5:
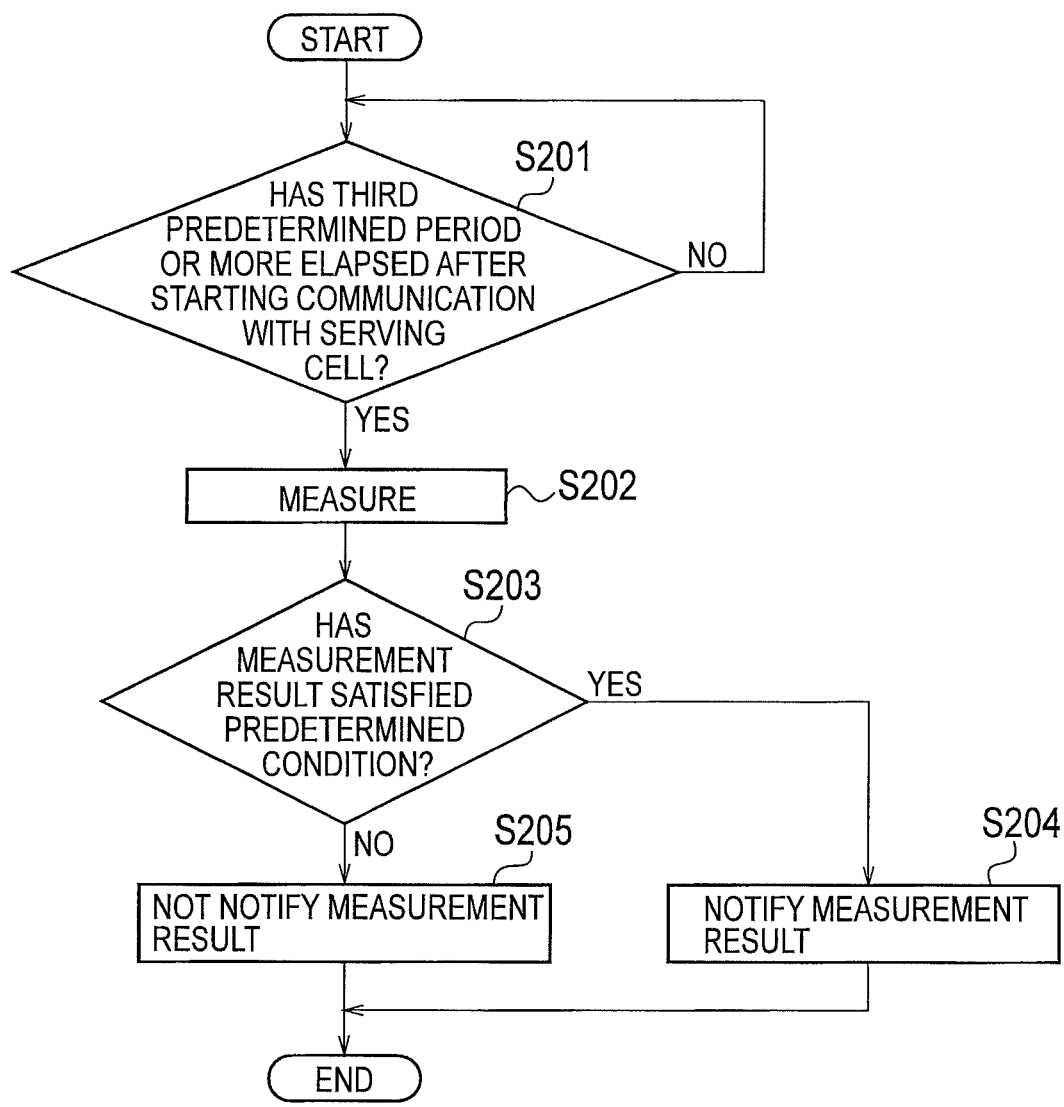
FIG. 5 is a flowchart illustrating the operation of a mobile station according to a first modification of the present invention.

As illustrated in FIG. 5, in step S201, the mobile station UE determines whether the third predetermined period or more has elapsed after the mobile station UE starts to communicate with the serving cell. When it is determined that the third predetermined period or more has elapsed after the mobile station UE starts to communicate with the serving cell, the mobile station UE measures radio quality of a serving cell and a neighboring cell in step S202.

In step S203, the mobile station UE determines whether the measurement result satisfies predetermined conditions. When it is determined that the measurement result satisfies the predetermined conditions, the mobile station UE notifies the radio base station eNB of the measurement result in step S204.

Meanwhile, when it is determined that the measurement result does not satisfy the predetermined conditions in step S203, the mobile station UE determines that the above-mentioned measurement result should not be notified to the radio base station eNB in step S204.

(Second Modification)

Furthermore, in the mobile communication system according to the second modification, the radio base station eNB having received a notification of the measurement result may also be configured to determine whether the mobile station UE should perform a handover, only when the fourth predetermined period or more has elapsed after the mobile station UE starts to communicate with the serving cell.

Figure 6:
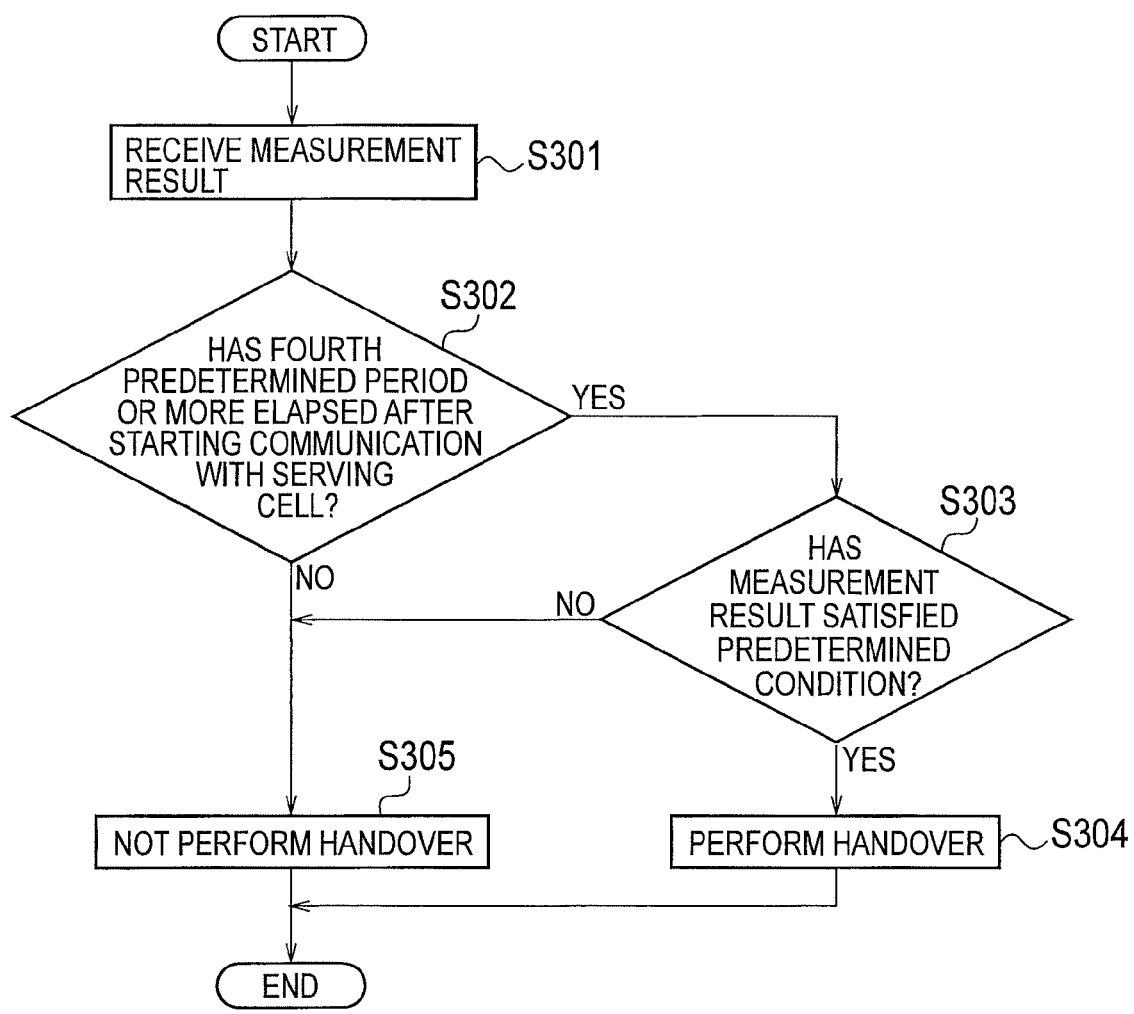
FIG. 6 is a flowchart illustrating the operation of a radio base station according to a second modification of the present invention.
Figure 7:
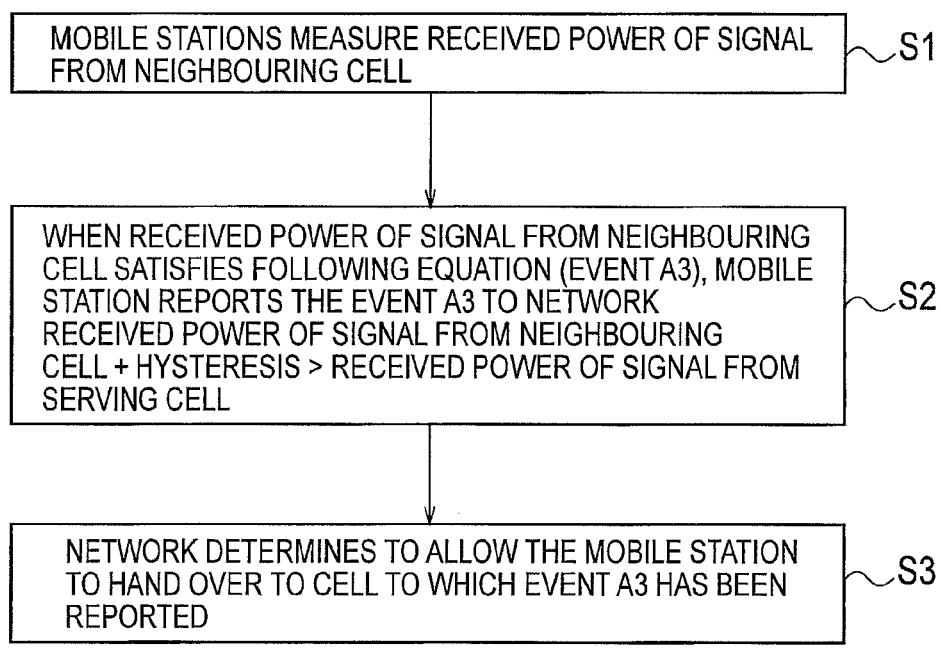
FIG. 7 is a flowchart illustrating a general handover operation.
Figure 8:
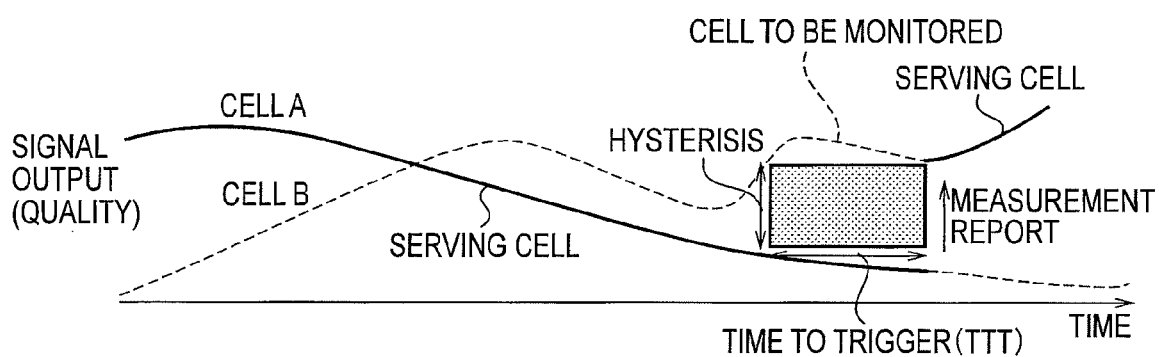
FIG. 8 is a diagram explaining a general notification method of a measurement report.

As illustrated in FIG. 6, the radio base station eNB receives the measurement result from the mobile station UE in step S301, and determines whether the fourth predetermined period or more has elapsed after the mobile station UE starts to communicate with the serving cell in step S302.

When it is determined that the fourth predetermined period or more has elapsed after the mobile station UE starts to communicate with the serving cell in step S302, the radio base station eNB determines whether the measurement result satisfies predetermined conditions in step S303. When it is determined that the measurement result satisfies the predetermined conditions, the radio base station eNB decides that the mobile station UE should perform a handover in step S304.

Meanwhile, when the radio base station eNB determines that the fourth predetermined period or more has not elapsed after the mobile station UE starts to communicate with the serving cell in step S302, the present operation proceeds to step S305.

Furthermore, when the radio base station eNB determines that the measurement result does not satisfy the predetermined conditions in step S303, the present operation proceeds to step S305.

In step S305, the radio base station eNB decides that the mobile station UE should not perform a handover.

The characteristics of the present embodiment as described above may be expressed as follows.

A first characteristic of the present embodiment is summarized in that a mobile station UE, which communicates with a radio base station eNB, includes: a parameter acquisition unit 12 configured to acquire a parameter from the radio base station eNB; a measurement unit 13 configured to measure radio quality in a serving cell and a neighboring cell of the mobile station UE; a determination unit 14 configured to determine whether to notify a measurement result based on the radio quality in the serving cell and the neighboring cell measured by the measurement unit 13, and the parameter acquired by the parameter acquisition unit 12; and a notification unit 15 configured to notify the radio base station eNB of the measurement result when the determination unit 14 determines that the measurement result should be transmitted, wherein only when a first predetermined period or more has elapsed after the mobile station UE starts to communicate with the serving cell, the determination unit 14 is configured to determine whether to notify the measurement result.

In the first characteristic of the present embodiment, when the first predetermined period or more has elapsed after the mobile station UE starts to communicate with the serving cell and only when predetermined conditions are continuously satisfied for a second predetermined period or more, the determination unit 14 may also be configured to determine that the measurement result should be notified, and the parameter acquisition unit 12 may also be configured to acquire a first parameter indicating the second predetermined period as a parameter.

In the first characteristic of the present embodiment, when a third predetermined period or more has elapsed after the mobile station UE starts to communicate with the serving cell, the measurement unit 13 may also be configured to determine that the measurement of the radio quality in the serving cell and the neighboring cell of the mobile station UE should be started, and the parameter acquisition unit 12 may also be configured to acquire a second parameter indicating the third predetermined period as a parameter.

A second characteristic of the present embodiment is summarized in that a radio base station eNB, which communicates with a mobile station UE, includes: a determination unit 22 configured to determine whether the mobile station UE should perform a handover based on a measurement result of radio quality in a serving cell and a neighboring cell of the mobile station UE, which has been notified by the mobile station UE, wherein the determination unit 22 is configured to determine whether the mobile station UE should perform a handover only when a fourth predetermined period or more has elapsed after the mobile station UE starts to communicate with the serving cell.

A third characteristic of the present embodiment is summarized in that a mobile communication system so configured that a radio base station eNB communicates with a mobile station UE, the mobile station UE includes: a parameter acquisition unit 12 configured to acquire a parameter from the radio base station eNB; a measurement unit 13 configured to measure radio quality in a serving cell and a neighboring cell of the mobile station UE; a determination unit 14 configured to determine whether to notify a measurement result based on the radio quality in the serving cell and the neighboring cell measured by the measurement unit 13, and the parameter acquired by the parameter acquisition unit 12; and a notification unit 15 configured to notify the radio base station eNB of the measurement result when the determination unit 14 determines that the measurement result should be transmitted, and the radio base station eNB includes: a parameter notification unit 21 configured to notify the mobile station UE of a parameter; and a determination unit 22 configured to determine whether the mobile station UE should perform a handover based on a measurement result of the radio quality in the serving cell and the neighboring cell of the mobile station UE, which has been notified by the mobile station UE, wherein only when a first predetermined period or more has elapsed after the mobile station UE starts to communicate with the serving cell, the determination unit 14 of the mobile station UE is configured to determine whether to notify the measurement result.

In the third characteristic of the present embodiment, when the first predetermined period or more has elapsed after the mobile station UE starts to communicate with the serving cell and only when predetermined conditions are continuously satisfied for a second predetermined period or more, the determination unit 14 of the mobile station UE may also be configured to determine that the measurement result should be notified, and the parameter acquisition unit 12 may also be configured to acquire a first parameter indicating the second predetermined period as a parameter.

In the third characteristic of the present embodiment, when a third predetermined period or more has elapsed after the mobile station UE starts to communicate with the serving cell, the measurement unit 13 may also be configured to determine that the measurement of the radio quality in the serving cell and the neighboring cell of the mobile station UE should be started, and the parameter acquisition unit 12 may also be configured to acquire a second parameter indicating the third predetermined period as a parameter.

In the third characteristic of the present embodiment, only when a fourth predetermined period or more has elapsed after the mobile station UE starts to communicate with the serving cell, the determination unit 22 of the radio base station eNB may also be configured to determine whether the mobile station UE should perform a handover.

In the third characteristic of the present embodiment, only when a fourth predetermined period or more has elapsed after the mobile station UE starts to communicate with the serving cell, the determination unit 22 of the radio base station eNB may also be configured to determine whether the mobile station UE should perform a handover.

A fourth characteristic of the present embodiment is summarized in that a mobile communication method, in which a radio base station eNB communicates with a mobile station UE, includes: a step A of notifying a parameter, by the radio base station eNB, to the mobile station UE; a step B of measuring, by the mobile station UE, radio quality in a serving cell and a neighboring cell of the mobile station UE; a step C of determining, by the mobile station UE, whether to notify a measurement result based on the radio quality in the serving cell and the neighboring cell measured in the step B and the parameter notified in step A; and a step D of notifying the measurement result, by the mobile station UE, to the radio base station eNB, when it is determined that the measurement result should be transmitted, wherein in the step C, only when a first predetermined period or more has elapsed after the mobile station UE starts to communicate with the serving cell, the mobile station UE determines whether to notify the measurement result.

In the fourth characteristic of the present embodiment, the mobile communication method includes a step E of determining, by the radio base station eNB, whether the mobile station UE should perform a handover based on a measurement result of the radio quality in the serving cell and the neighboring cell of the mobile station UE, which has been notified by the mobile station UE, wherein in the step E, only when a fourth predetermined period has elapsed after the mobile station UE is handed over to a cell subordinate to the radio base station, the radio base station eNB may also determine whether the mobile station UE should perform a handover.

In the fourth characteristic of the present embodiment, the mobile communication method further includes a step E of determining, by the radio base station eNB, whether the mobile station UE should perform a handover based on the measurement result of the radio quality in the serving cell and the neighboring cell of the mobile station UE, which has been notified by the mobile station UE, wherein in the step E, only when the fourth predetermined period or more has elapsed after the mobile station UE starts to communicate with the serving cell, the radio base station eNB determines whether the mobile station UE should perform a handover.

In addition, in the above-mentioned example, only when the fourth predetermined period or more has elapsed after the mobile station UE starts to communicate with the serving cell, the radio base station eNB determines whether the mobile station UE should perform a handover. However, instead, in step E, only when the first predetermined period or the third predetermined period or more has elapsed after the mobile station UE starts to communicate with the serving cell, the radio base station eNB may also determine whether the mobile station UE should perform a handover.

It is noted that the operation of the above-described the radio base station eNB or the mobile station UE may be implemented by a hardware, may also be implemented by a software module executed by a processor, and may further be implemented by the combination of the both.

The software module may be arranged in a storage medium of an arbitrary format such as RAM (Random Access Memory), a flash memory, ROM (Read Only Memory), EPROM (Erasable Programmable ROM), EEPROM (Electronically Erasable and Programmable ROM), a register, a hard disk, a removable disk, and CD-ROM.

The storage medium is connected to the processor so that the processor can write and read information into and from the storage medium. Such a storage medium may also be accumulated in the processor. The storage medium and processor may be arranged in ASIC. Such the ASIC may be arranged in the radio base station eNB or the mobile station UE. Further, such a storage medium or a processor may be arranged, as a discrete component, in the radio base station eNB or the mobile station UE.

Thus, the present invention has been explained in detail by using the above-described embodiments; however, it is obvious that for persons skilled in the art, the present invention is not limited to the embodiments explained herein. The present invention can be implemented as a corrected and modified mode without departing from the gist and the scope of the present invention defined by the claims. Therefore, the description of the specification is intended for explaining the example only and does not impose any limited meaning to the present invention.

The invention claimed is:

1. A mobile station, which includes a processor and a memory and communicates with a radio base station, comprising:
   a parameter acquisition unit configured to acquire a parameter from the radio base station;
   a measurement unit configured to measure radio quality in a serving cell and a neighboring cell of the mobile station;
   a determination unit configured to determine whether to notify a measurement result based on the radio quality in the serving cell and the neighboring cell measured by the measurement unit, and the parameter acquired by the parameter acquisition unit; and
   a notification unit configured to notify the radio base station of the measurement result when the determination unit determines that the measurement result is to be transmitted,
   wherein a determination as to whether to notify the measurement result is left pending until a first predetermined period has elapsed after the mobile station starts to communicate with the serving cell.

2. The mobile station according to claim 1, wherein
   when the first predetermined period or more has elapsed after the mobile station starts to communicate with the serving cell and only when predetelluined conditions are continuously satisfied for a second predetermined period or more, the determination unit is configured to determine that the measurement result is to be notified, and
   the parameter acquisition unit is configured to acquire a first parameter indicating the second predetermined period as a parameter.

3. The mobile station according to claim 1, wherein
   when a third predetermined period or more has elapsed after the mobile station starts to communicate with the serving cell, the measurement unit is configured to determine that measurement of the radio quality in the serving cell and the neighbouring cell of the mobile station is to be started, and
   the parameter acquisition unit is configured to acquire a second parameter indicating the third predetermined period as a parameter.

4. A mobile communication system so configured that a radio base station including a processor and a memory communicates with a mobile station including a processor and a memory and, wherein
   the mobile station comprises:
   a parameter acquisition unit configured to acquire a parameter from the radio base station;

a measurement unit configured to measure radio quality in a serving cell and a neighboring cell of the mobile station;

a determination unit configured to determine whether to notify a measurement result based on the radio quality in the serving cell and the neighboring cell measured by the measurement unit, and the parameter acquired by the parameter acquisition unit; and a notification unit configured to notify the radio base station of the measurement result when the determination unit determines that the measurement result is to be transmitted, and the radio base station comprises:

a parameter notification unit configured to notify the mobile station of the parameter; and a determination unit configured to determine whether the mobile station performs a handover based on the measurement result of the radio quality in the serving cell and the neighboring cell of the mobile station, which has been notified by the mobile station, wherein a determination as to whether to notify the measurement result is left pending until a first predetermined period has elapsed after the mobile station starts to communicate with the serving cell.

5. The mobile communication system according to claim 4, wherein, only when a fourth predetermined period or more has elapsed after the mobile station starts to communicate with the serving cell, the determination unit of the radio base station is configured to determine whether the mobile station performs a handover.

6. A mobile communication method, in which a radio base station communicates with a mobile station, comprising:

a step A of notifying a parameter, by the radio base station, to the mobile station;

a step B of measuring, by the mobile station, radio quality in a serving cell and a neighboring cell of the mobile station;

a step C of determining, by the mobile station, whether to notify a measurement result based on the radio quality in the serving cell and the neighbouring cell measured in the step B, and the parameter notified in step A; and a step D of notifying the measurement result, by the mobile station, to the radio base station, when it is determined that the measurement result is to be transmitted, wherein in the step C, a determination as to whether to notify the measurement result is left pending until a first predeteriniined period has elapsed after the mobile station starts to communicate with the serving cell.

7. The mobile communication method according to claim 6, further comprising:

a step E of determining, by the radio base station, whether the mobile station should perform a handover based on the measurement result of the radio quality in the serving cell and the neighboring cell of the mobile station, which has been notified by the mobile station, wherein in the step E, only when a fourth predetermined period or more has elapsed after the mobile station starts to communicate with the serving cell, the radio base station determines whether the mobile station performs a handover.

8. The mobile communication method according to claim 6, further comprising:

determine that measurement of the radio quality in the serving cell and the neighbouring cell of the mobile station is to be started when a third predetermined period or more has elapsed after the mobile station starts to communicate with the serving cell, and acquiring a second parameter indicating the third predetermined period as a parameter.

\* \* \* \* \*